US010751626B2

(12) United States Patent
Wang

(10) Patent No.: US 10,751,626 B2
(45) Date of Patent: Aug. 25, 2020

(54) COLLISION CONTROL METHOD AND APPARATUS, AND STORAGE MEDIUM

(71) Applicant: TENCENT TECHNOLOGY (SHENZHEN) COMPANY LIMITED, Shenzhen, Guangdong (CN)

(72) Inventor: Jing Yuan Wang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 27 days.

(21) Appl. No.: 16/003,283

(22) Filed: Jun. 8, 2018

(65) Prior Publication Data
US 2018/0290059 A1 Oct. 11, 2018

Related U.S. Application Data
(63) Continuation of application No. PCT/CN2017/093421, filed on Jul. 18, 2017.

(30) Foreign Application Priority Data
Jul. 28, 2016 (CN) .......................... 2016 1 0616634

(51) Int. Cl.
A63F 13/577 (2014.01)
A63F 13/58 (2014.01)
(Continued)

(52) U.S. Cl.
CPC .......... A63F 13/577 (2014.09); A63F 13/355 (2014.09); A63F 13/50 (2014.09);
(Continued)

(58) Field of Classification Search
None
See application file for complete search history.

(56) References Cited

U.S. PATENT DOCUMENTS 5,680,534 A * 10/1997 Yamato .................. A63F 13/10
345/473
6,067,096 A * 5/2000 Nagle ..................... G06T 13/20
345/473
(Continued)

FOREIGN PATENT DOCUMENTS

CN 1975785 A 6/2007
CN 101071515 A 11/2007
(Continued)

OTHER PUBLICATIONS

Communication dated Jan. 31, 2019, issued by the State Intellectual Property Office of the P.R.C. in CN Application No. 201610616634.9.

(Continued)

Primary Examiner — Jason T Yen
(74) Attorney, Agent, or Firm — Sughrue Mion, PLLC

(57) ABSTRACT

A collision control method and apparatus, and a storage medium are provided. The method includes obtaining a collision action to be performed by a first control object in a game client and entity information of the first control object. The entity information includes first entity information representing a skeleton of the first control object, and second entity information representing a group of colliders of the first control object excluding the skeleton and driven by the skeleton. The skeleton and the group of colliders are controlled to perform the collision action of the first control object with a second control object based on the entity information.

13 Claims, 11 Drawing Sheets

(51) Int. Cl.
  *A63F 13/50* (2014.01)
  *A63F 13/355* (2014.01)
  *A63F 13/837* (2014.01)

(52) U.S. Cl.
  CPC ............ *A63F 13/58* (2014.09); *A63F 13/837* (2014.09); *A63F 2300/638* (2013.01); *A63F 2300/64* (2013.01); *A63F 2300/643* (2013.01); *A63F 2300/65* (2013.01); *A63F 2300/66* (2013.01)

(56) References Cited

U.S. PATENT DOCUMENTS

| | | | | |
|---|---|---|---|---|
| 2002/0082065 | A1* | 6/2002 | Fogel | A63F 13/12 463/8 |
| 2004/0143852 | A1 | 7/2004 | Meyers | |
| 2006/0258445 | A1* | 11/2006 | Nishimori | A63F 13/10 463/30 |
| 2008/0309664 | A1* | 12/2008 | Zhou | G06T 13/40 345/420 |
| 2015/0314194 | A1* | 11/2015 | Lord | A63F 13/577 463/35 |

FOREIGN PATENT DOCUMENTS

| | | |
|---|---|---|
| CN | 101458825 A | 6/2009 |
| CN | 102163077 A | 8/2011 |
| CN | 104281458 A | 1/2015 |
| CN | 104606886 A | 5/2015 |
| CN | 104606887 A | 5/2015 |
| CN | 105469406 A | 4/2016 |
| CN | 106215419 A | 12/2016 |
| JP | 2016-041238 A | 3/2016 |

OTHER PUBLICATIONS

International Search Report of PCT/CN2017/093421 dated Oct. 24, 2017.

* cited by examiner

RELATED ART

RELATED ART

COLLISION CONTROL METHOD AND APPARATUS, AND STORAGE MEDIUM

CROSS-REFERENCE TO RELATED APPLICATIONS

This application is a continuation of International Patent Application No. PCT/CN2017/093421 filed on Jul. 18, 2017, which claims priority from Chinese Patent Application No. 2016106166349, filed with the Chinese Patent Office on Jul. 28, 2016, the disclosures of each of which are incorporated by reference herein in their entirety.

BACKGROUND

1. Field

This application relates to the field of computers, and specifically, to a collision control method and apparatus, and a storage medium.

2. Description of Related Art

In a related art 3D role play-type game application, a result of a fight is determined by energy values of different roles/player characters. In a 3D action-type game application, a result of a fight is usually determined by a precise calculation result of a collision that has occurred during the fight between roles/player characters. For a network game, because a quantity of roles/player characters participating in a fight far exceeds that in a standalone game, there is a problem with synchronization caused by delays in network transmission, and it is not easy for the network game to provide a good fight experience.

In addition, to implement precise collision determining, a special-purpose third-party engine needs to be used to perform collision determining calculation. However, because of a large calculation amount of collision determining and complex modeling, the third-party engine is usually used in a client terminal. This leads to two problems. Firstly, calculation results of different clients may be different due to the existence of a network delay. Secondly, it is possible to cheat by hacking the engine and maliciously modifying the engine on the client terminal, so that a game is not fair. Therefore, to ensure a consistent experience of different clients and avoid cheating, collision determining calculation of an action-type network game is usually performed at a server end.

A server end in the related art usually simplifies three-dimensional (3D) modeling and uses a volume pixel (voxel) modeling manner. The concept of voxel is derived from pixel, the smallest unit in the two-dimensional (2D) space. Pixel is used for describing a 2D image, and is the smallest unit in the 2D space. Voxel is used for describing a 3D object in the 3D space, and is the smallest unit in the 3D space.

That is, when collision control is performed by using a voxel-based 3D model provided in the related art technology, to reduce the calculation amount, cubes used for collision calculation are not likely to be made excessively small. Consequently, it is not easy to ensure the accuracy of the collision control process.

For the foregoing problem, no effective solution has been provided.

SUMMARY

It is an aspect to provide a collision control method and apparatus, and a storage medium, to at least resolve the technical problem of a relatively low accuracy caused by the related art collision control method.

According to an aspect of one or more embodiments, there is provided a method. The method includes obtaining a collision action to be performed by a first control object in a game client and entity information of the first control object. The entity information includes first entity information representing a skeleton of the first control object, and second entity information representing a group of colliders of the first control object excluding the skeleton and driven by the skeleton. The skeleton and the group of colliders are controlled to perform the collision action of the first control object with a second control object based on the entity information.

According to other aspects of one or more embodiments, there is also provided an apparatus and a computer-readable storage medium consistent with the method.

BRIEF DESCRIPTION OF THE DRAWINGS

Various embodiments are described below with reference to the accompanying drawings, in which.

DETAILED DESCRIPTION

To make a person in the art understand the solutions in this application better, the following clearly and completely describes the technical solutions in the embodiments of this application with reference to the accompanying drawings in which the embodiments of this application are shown. The described embodiments are only exemplary and are merely some but not all of the embodiments of this application. All other embodiments obtained by a person of ordinary skill in the art based on the embodiments of this application without creative efforts shall fall within the protection scope of this application and the appended claims.

It should be noted that, in the specification, claims, and accompanying drawings of this application, the terms "first", "second", and the like are intended to distinguish between similar objects and not describe a specific order or sequence. It should be understood that the data termed in such a way is interchangeable in proper circumstances so that the embodiments of this application described herein can be implemented in other orders than the order illustrated or described herein. Moreover, the terms "include", "contain" and any other variants mean to cover the non-exclusive inclusion. For example, a process, method, system, product, or device that includes a list of steps or units is not necessarily limited to those steps or units expressly listed, but may include other steps or units not expressly listed or inherent to such a process, method, product, or device.

Figure 1:
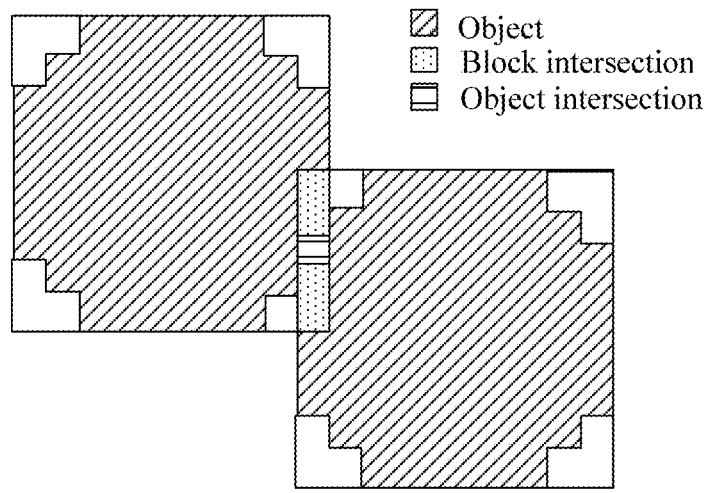
FIG. 1 is a schematic diagram of a collision control method according to the related art technology.

As discussed above, a server may establish a 3D model by using voxels. Although being relatively rough (where because the smallest accessible unit in the 3D model is a grid instead of a point, the 3D model can only be referred to as pseudo-3D), the modeling manner can approximately simulate an object in the 3D world. Collision detection by the 3D model established by the server end based on voxels is very easy. With reference to FIG. 1 (where for ease of observation, a 2D image is used for representation, and the principle of 3D is the same as that of 2D), steps of the collision detection includes:

(1) establishing a cuboid (for example, a block shown in FIG. 1) to enclose each object (for example, an oblique-line shadow part in FIG. 1).

(2) detecting whether a cuboid of one object intersects with that of another object, and if yes, it indicates that the two objects are very close to each other or have overlapped parts (for example, a block intersection indicated by a dotted shadow part in FIG. 1).

(3) detecting whether voxels of the two objects in the intersected part of the two cuboids collide with each other (for example, an object intersection indicated by a horizontal-line shadow part in FIG. 1).

Figure 2:
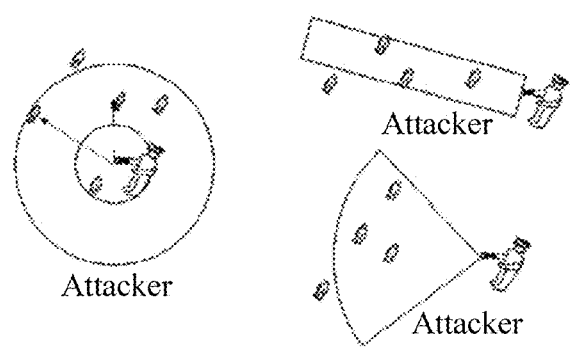
FIG. 2 is a schematic diagram of another collision control method according to the related art technology.

However, the foregoing collision detection has the following disadvantages:

(1) Same as a 2D pixel animation, a 3D voxel animation is preset, so that one role/player character can only perform limited actions. Therefore, a moving trajectory of the role/player character is fixed and regular, and it is not easy to simulate an irregularly moving trajectory of a real action in the real world. Therefore, usually, only collision of a role/player character (or an object such as a weapon) in a regular moving range can be detected, and it is not easy to simulate and calculate an irregularly moving trajectory. This greatly worsens operation experience of a player, as shown in FIG. 2.

Figure 3:
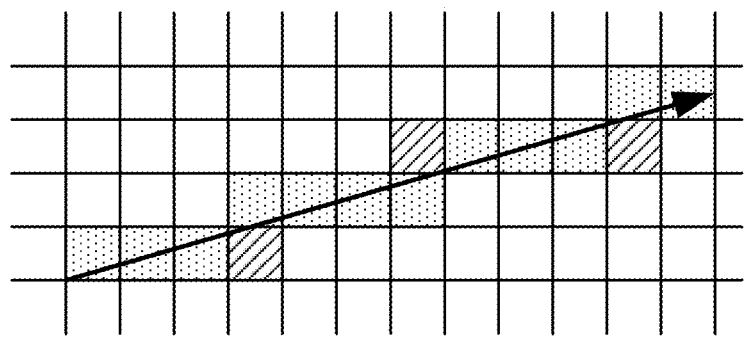
FIG. 3 is a schematic diagram of still another collision control method according to the related art technology.

(2) Similar to that a basic unit of a pixel model is a cuboid, a basic unit of a voxel is a cube. To reduce a calculation amount for a server end, a cube is not likely to be made excessively small. Consequently, it is not easy to implement precise collision calculation. As shown in FIG. 3, when moving along an oblique straight line (a straight line with an arrow shown in FIG. 3), a cube collides with a plurality of cubes. However, the cubes marked by oblique lines in FIG. 3 are already deviated from the straight line for a relatively long distance, so that when the cubes are relatively large, the collision calculation determining is inaccurate.

When collision control is performed by using a voxel-based 3D model, cubes are generally kept large in order to reduce the calculation amount. However, this decreases the accuracy of the collision control process.

According to various exemplary embodiments, after obtaining a collision action to be performed by a first control object in a game client, a server obtains entity information of the first control object, the entity information including first entity information being used for representing a skeleton of the first control object and second entity information being used for representing a group of colliders of the first control object excluding the skeleton and driven by the skeleton, to control the skeleton and the group of colliders to perform the collision action. That is, the first control object in the game client is simplified, and the collision action is performed by using the skeleton and the group of colliders obtained by simplification and matching the first control object, so that an objective of reducing the calculation amount in a collision determining process and improving the calculation accuracy is achieved. In this way, a problem is resolved that, in the related art technology, in a collision determining process performed by using a voxel-based model, it is hard to ensure the accuracy of the collision determining when the calculation amount is reduced, thereby achieving an effect of improving the accuracy of collision control performed on the first control object.

In addition, by simplifying the first control object to obtain the skeleton and the group of colliders that match the first control object, the overhead of processing collision control by the server is greatly reduced, thereby achieving an objective of reducing a processing time period and implementing real-time and synchronous controlling, and further achieving an effect of improving the efficiency of collision control.

Various embodiments of the application are described below, and with reference to the accompanying drawings.

Embodiment 1

Figure 4:
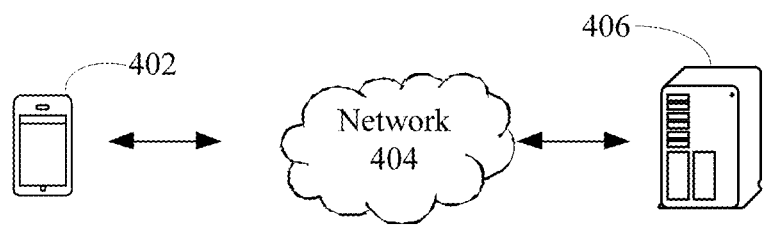
FIG. 4 is a schematic diagram of an application environment of a collision control method according to an embodiment of this application.

In this embodiment of this application, an embodiment of the foregoing collision control method is provided. In an implementation, the collision control method may be applied but is not limited to an application environment shown in FIG. 4. A terminal 402 on which a game client (for example, a 3D action-type game application) runs interacts with a game server 406 corresponding to the game client by using a network 404. The game server 406 obtains, by using the network 404, a collision action to be performed by a first control object in the game client, and then obtains entity information of the first control object. The entity information includes: first entity information being used for representing a skeleton of the first control object, and second entity information being used for representing a group of colliders of the first control object excluding the skeleton and driven by the skeleton. Then, the game server 406 controls the skeleton and the group of colliders to perform the collision action.

Figure 5:
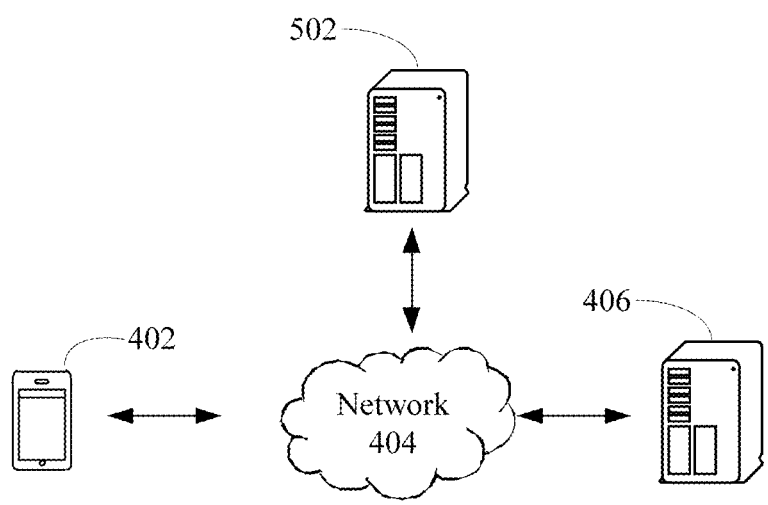
FIG. 5 is a schematic diagram of an application environment of another collision control method according to an embodiment of this application.

In another implementation, the collision control method may be applied but is not limited to an application environment shown in FIG. 5. A terminal 402 on which a game client (for example, a 3D action-type game application) runs interacts, by using a network 404, with a game server 406 corresponding to the game client and a processing server 502 used for performing the collision control method. The processing server 502 obtains, by using the network 404, a collision action to be performed by a first control object in the game client, and then obtains entity information of the first control object. The entity information includes: first entity information being used for representing a skeleton of the first control object, and second entity information being used for representing a group of colliders of the first control object excluding the skeleton and driven by the skeleton. Then, the processing server 502 controls the skeleton and the group of colliders to perform the collision action.

It should be noted that, the foregoing server used for performing the collision control method may be replaced with but is not limited to a hardware device having a big data processing capability, for example, a processor. This is not limited in this embodiment.

In some embodiments, the foregoing terminal may include but is not limited to at least one of the following: a mobile phone, a tablet computer, a notebook computer, a desktop PC, or another terminal on which a game client is installed. The foregoing network may include but is not limited to at least one of the following: a wide area network, a metropolitan area network, or a local area network. The foregoing is merely exemplary, and no limitation is set in this embodiment.

Figure 6:
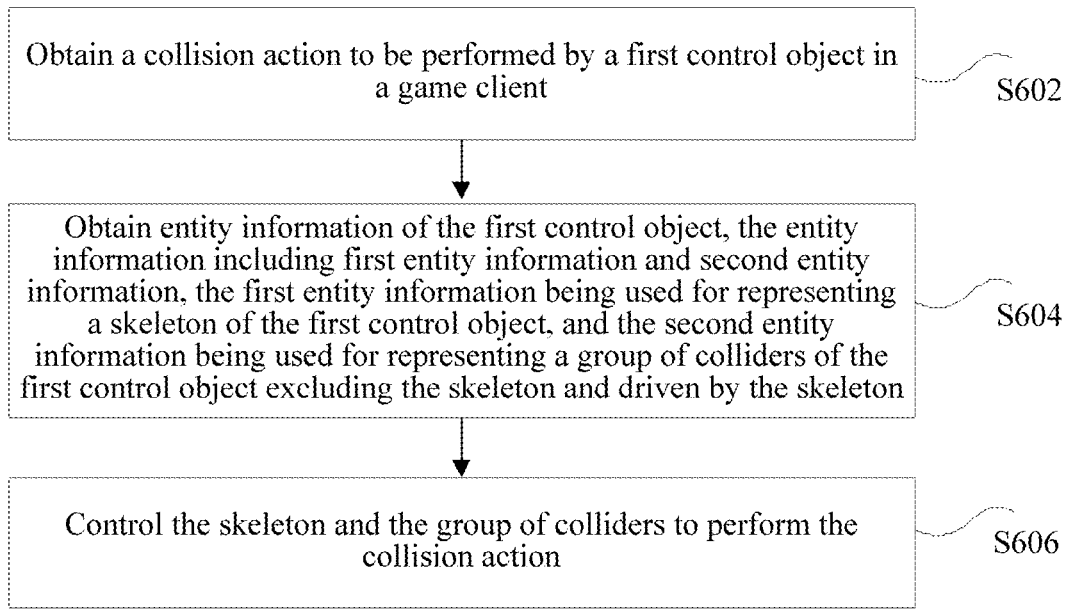
FIG. 6 is a flowchart of a collision control method according to an embodiment of this application.

According to this embodiment of this application, a collision control method is provided. As shown in FIG. 6, the method includes:

S602: obtaining a collision action to be performed by a first control object in a game client.

S604: obtaining entity information of the first control object, the entity information including first entity information and second entity information, the first entity information being used for representing a skeleton of the first control object, and the second entity information being used for representing a group of colliders of the first control object excluding the skeleton and driven by the skeleton.

S606: controlling the skeleton and the group of colliders to perform the collision action.

In some embodiments, the collision control method may be applied but is not limited to a 3D network game application, for example, a role play-type game application or an action-type game application. The first control object in the game client may be but is not limited to any role in a 3D game application, for example, a character role. The foregoing is merely exemplary, and no limitation is set in this embodiment.

It should be noted that, in this embodiment, after obtaining the collision action to be performed by the first control object in the game client, the server obtains the entity information of the first control object, the entity information including the first entity information being used for representing a skeleton of the first control object and the second entity information being used for representing a group of colliders of the first control object excluding the skeleton and driven by the skeleton, to control the skeleton and the group of colliders to perform the collision action. That is, the first control object in the game client is simplified, to ignore detailed information related to rendering (used for reflecting a real appearance of the first control object but not related to collision control), and the collision action is performed by using the skeleton and the group of colliders obtained by simplification and matching the first control object, so that an objective of reducing the calculation amount in a collision determining process and improving the calculation accuracy is achieved. In this way, a problem is resolved that, in the related technology, in a collision determining process performed by using a voxel-based model, it is hard to ensure the accuracy of the collision determining when the calculation amount is reduced, thereby achieving an effect of improving the accuracy of collision control performed on the first control object. In addition, by simplifying the first control object to obtain the skeleton and the group of colliders that match the first control object, overheads of processing collision control by the server is greatly reduced, thereby achieving an objective of reducing a processing time period and implementing real-time and synchronous controlling, and further achieving an effect of improving the efficiency of collision control.

In some embodiments, after the entity information of the first control object is obtained, the method further includes: constructing a skeleton according to the first entity information, the skeleton including a head skeleton, a torso skeleton, and a leg skeleton; and constructing a group of colliders of the first control object according to the second entity information, the group of colliders including at least one of the following: a body collider or an equipment collider, the body collider including a head collider, a torso collider, and a leg collider. It should be noted that, in this embodiment, the group of colliders may be referred to as but is not to a collider group. This is not described in detail below.

Figure 7:
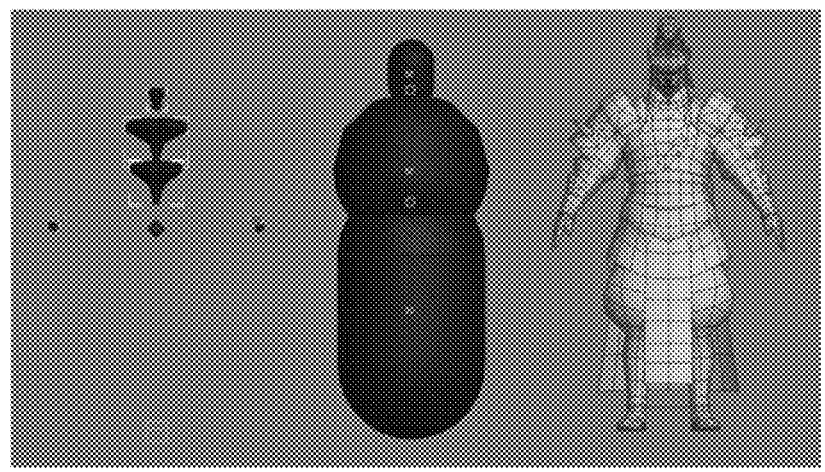
FIG. 7 is a schematic diagram of a collision control method according to an embodiment of this application.

For example, a presentation effect of the first control object (for example, a character role) may be but is not limited to that shown in the rightmost part of FIG. 7, and a presentation effect of the skeleton (represented by the first entity information) matching the first control object may be but is not limited to that shown in the leftmost part of FIG. 7, and a presentation effect of the group of colliders (represented by the second entity information) may be but is not limited to that shown in the middle part of FIG. 7. Each of a head, a torso and legs of the first control object is replaced with a capsule (two ends of which are spheroidal and a middle part of which is cylinder-like) to obtain the colliders. It should be noted that, the torso part may be replaced with a plurality of segments of different 3D components such as spheres or cylinders to obtain a corresponding collider. This is not limited in this embodiment.

It should be noted that, in an operation performed in a game application, the head, the body and the legs are usually effective parts for determining collision. For example, in an action-type game application, whether an attack is effective is usually determined by determining whether the head, the body or the legs is attacked. In addition, an error between a length of the simplified skeleton relative to a weapon equipment and a length of the original first control object and an error between a length of the simplified group of colliders relative to the weapon equipment and the length of the original first control object may be ignored. Therefore, in this embodiment, collision control and collision detection are relatively accurate after the foregoing simplification is performed.

Figure 8:
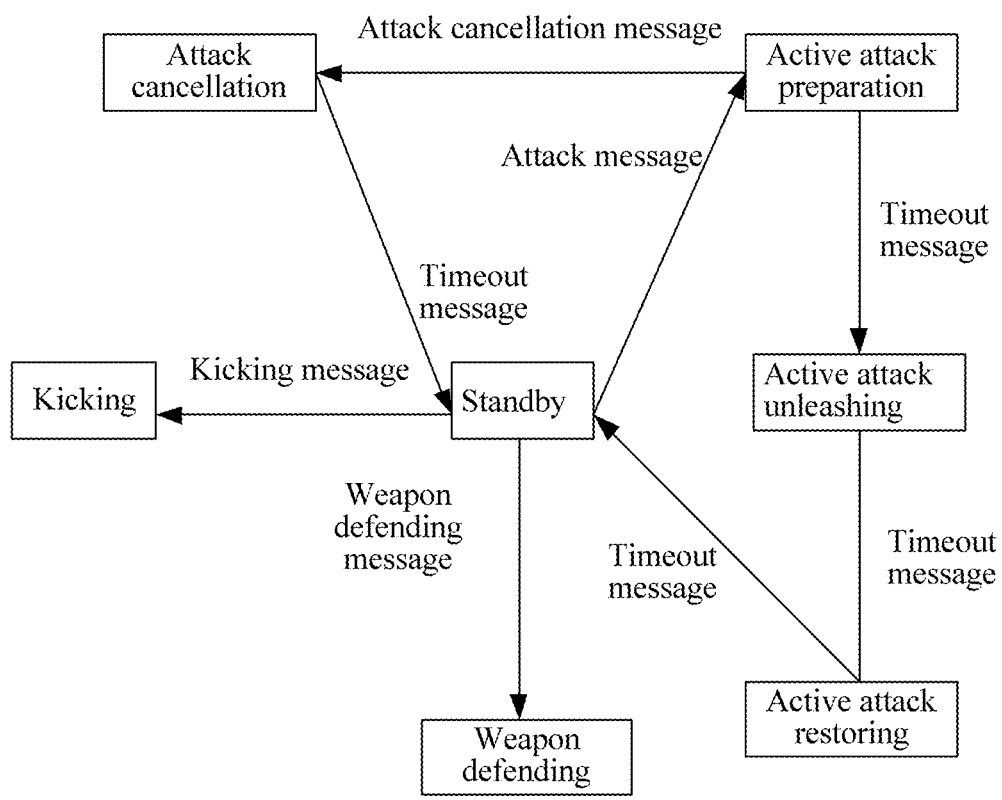
FIG. 8 is a flowchart of another collision control method according to an embodiment of this application.

In some embodiments, the foregoing collision action may correspond but is not limited to a set of successive collision animations. In this embodiment, controlled conversion of the action in the foregoing collision control process may be implemented by but is not limited to by using an action state machine. For example, as shown in FIG. 8, using a fight state as an example, different action states (for example, blocks shown in FIG. 8) and switching manners between the states (for example, straight lines with arrows shown in FIG. 8) are set in the action state machine. Controlled conversion of the animation may be implemented by but is not limited to by using a corresponding animation state machine. Reference for a set relationship may be made but is not limited to FIG. 8. This is not described in detail in this embodiment.

Figure 9:
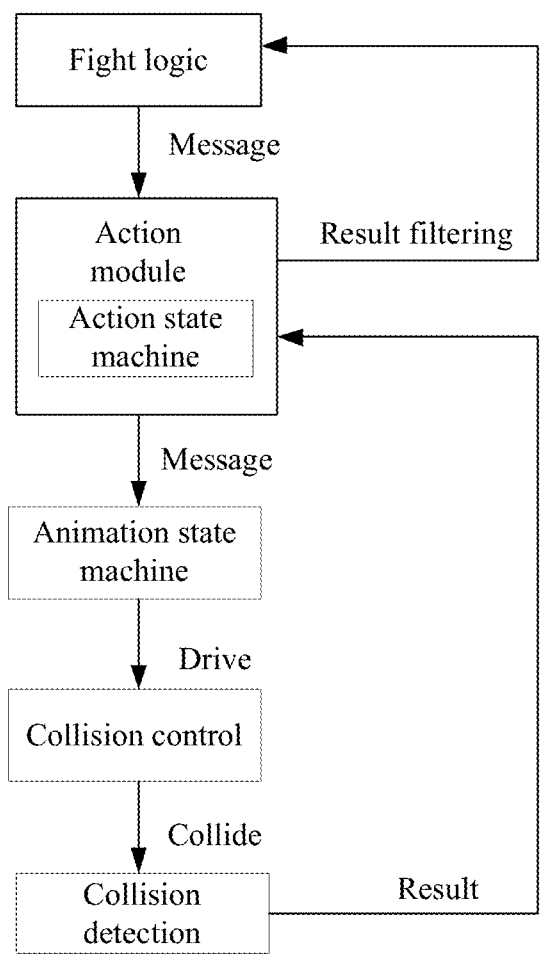
FIG. 9 is a schematic flowchart of still another collision control method according to an embodiment of this application.

Specifically, steps of implementing collision control by using the action state machine and the animation state are described with reference to FIG. 9.

S1: Obtain the collision action to be performed (for example, obtain, by using instructions, the collision action to be performed), and a fight logical module sends a message to an action module.

S2: An action state machine in the action module performs state switching in response to the message, and sends a message to the animation state machine.

S3: The animation state machine drives, in response to the message, the first control object to enter a corresponding animation state.

S4: Drive the group of colliders matching the first control object to perform a collision movement in a 3D space.

S5: A physical engine detects the collision generated by the group of colliders, and a plurality of pieces of collision information is detected in each collision.

S6: Feedback the collision information to the action module, and the action module analyzes and filters the collision information according to a requirement of the current state, and then feeds back the filtered result to a fight logic. The requirement of the current state may include but is not limited to: whether the current state is a state in which the collision is generated, in which time segments in the state a collision is effective, or the like.

S7: The fight logic calculates a result according to the collision, and notifies the game client of the result to present the collision animation.

It should be noted that, in this embodiment, the action state machine may be used for but is not limited to providing a series of interfaces for a fight logic on an upper-layer, and receiving instructions and processing the received instructions, thereby shielding other details irrelevant to the action for the upper layer. The upper-layer logic only knows the action and performs driving. A lower-layer system does not care about the upper-layer fight logic, for example, whether an action can interrupt another action, or an operation performed for entering or exiting from an action. In addition, the action state machine is further used for performing verification and filtering a collision detection result. For example, if the colliders collide when not in a fight state, collision information may also be generated. Such collision information is to be filtered out and ignored. A plurality of pieces of collision information generated in a fight state also is to be effectively filtered, and only effective collision information is obtained, thereby achieving an objective of reducing the processing amount and processing overheads. The foregoing animation state machine may be used for but is not limited to managing skeleton animations corresponding to different skeletons. It should be noted that, in this embodiment, the skeleton is used for driving the group of colliders to move. Therefore, in each segment of collision animation corresponding to the collision action, when the skeleton is controlled to move (for example, collide) correspondingly, the group of colliders excluding the skeleton and driven by the skeleton are driven to move (for example, collide) correspondingly.

In some embodiments, the server may use but is not limited to a Havok physical engine to implement real-time collision control. It should be noted that, the foregoing Havok physical engine is used for providing rapid and highly efficient physical simulation calculation. In this embodiment, by simplifying the first control object to obtain the corresponding skeleton and group of colliders, and then using the highly efficient processing capability of the Havok physical engine, real-time collision control with a high performance can be further ensured. In addition, all fight results are determined based on real physical force-bearing, so that the collision detection effect is more real.

In some embodiments, the foregoing controlling the skeleton and the group of colliders to perform the collision action includes: updating, according to an action type of the collision action at a pre-determined frequency, a collision animation matching the collision action and performed by the skeleton and the group of colliders of the first control object.

It should be noted that, because different action types require different presentation effects, for example, when the action type is an attack type, a relatively large quantity of collision actions are involved, in this embodiment, the corresponding collision animation may be updated at but is not limited to a frequency greater than a pre-determined threshold. On the contrary, when the action type is a non-attack type, because no collision action is involved, the corresponding collision animation may be updated at but is not limited to a frequency less than or equal to the pre-determined threshold. In addition, in this embodiment, different processes of an action type may be set with but is not limited to different update frequencies. This is not limited in this embodiment. By updating the corresponding collision animation in the frequency-changing update manner, processing overheads of collision control is ensured to be reduced, thereby achieving an objective of presenting the collision animation in real time and accurately.

In some embodiments, after the controlling the skeleton and the group of colliders to perform the collision action, the method further includes: controlling the game client to present, according to a timeline of a server, the collision action performed by the first control object.

It should be noted that, in this embodiment, to avoid inconsistency between the client and the server and that between different clients caused by network delay and network fluctuation, all logics in the game client are controlled to be consistent with the timeline of the server. A logic of the server is pushed forward along a fixed timeline. By using the foregoing method, a synchronization mechanism is implemented between the client and the server, thereby effectively resolving the problem of inconsistency caused by network transmission.

In this embodiment of this application, after obtaining the collision action to be performed by the first control object in the game client, the server obtains the entity information of the first control object, the entity information including the first entity information being used for representing a skeleton of the first control object and the second entity information being used for representing a group of colliders of the first control object excluding the skeleton and driven by the skeleton, to control the skeleton and the group of colliders to perform the collision action. That is, the first control object in the game client is simplified, to ignore detailed information related to rendering (used for reflecting a real appearance of the first control object but not related to collision control), and the collision action is performed by using the skeleton and the group of colliders obtained by simplification and matching the first control object, so that an objective of reducing the calculation amount in a collision determining process and improving the calculation accuracy is achieved. In this way, a problem is resolved that, in the related technology, in a collision determining process performed by using a voxel-based model, it is hard to ensure the accuracy of the collision determining when the calculation amount is reduced, thereby achieving an effect of improving the accuracy of collision control performed on the first control object. In addition, by simplifying the first control object to obtain the skeleton and the group of colliders that match the first control object, overheads of processing collision control by the server is greatly reduced, thereby achieving an objective of reducing a processing time period and implementing real-time and synchronous controlling, and further achieving an effect of improving the efficiency of collision control.

In some embodiments, the controlling the skeleton and the group of colliders to perform the collision action may include:

S1: updating, according to an action type of the collision action at a pre-determined frequency, a collision animation matching the collision action and performed by the skeleton and the group of colliders of the first control object.

In some embodiments, different action types may be configured with but are not limited to different pre-determined frequencies. For example, an attack type action may be configured with but is not limited to a high frequency for updating, and a non-attack type action may be configured with but is not limited to a low frequency for updating. For example, a lowest frequency may be 1 time per second, and a highest frequency may be 20 times per second.

It should be noted that, when a role (for example, a control object) in a game application is walking and moving, or is performing an action irrelevant to fight collision, because a real-time quality is not required to be very high, in this embodiment, the actions may be configured with but is not limited to a frequency lower than a pre-determined threshold (that is, a low frequency) for updating, provided that the actions are ensured to reach a target location after being performed. The target location may be but is not limited to an initial location of a collision action updated at a frequency higher than a pre-determined threshold (that is, a high frequency). In this way, it is ensured that when the collision action is performed, accurate and real-time collision control can be implemented.

In some embodiments, the updating the collision animation may be but is not limited to updating a location of the skeleton and a location of the corresponding group of colliders in the collision animation. That is, in this embodiment, it may be but is not limited to obtaining, in real time, a performing progress of the collision animation corresponding to the collision action, calculating the location of the skeleton according to the performing progress, and obtaining the location of the group of colliders corresponding to the location of the skeleton, to update the location of the group of colliders.

In this embodiment of this application, updating of the collision animation corresponding to the collision action may be controlled according to different action types and by using the frequency-changing update policy, so that an objective of saving a large quantity of calculation processing overheads and improving the application performance is achieved, thereby ensuring the real-time quality and the accuracy of collision control.

In some embodiments, the updating, according to an action type of the collision action at a pre-determined frequency, a collision animation matching the collision action and performed by the skeleton and the group of colliders of the first control object may include:

S1: when the action type is an attack type, updating, at a frequency greater than a first pre-determined threshold, the collision animation performed by the skeleton and the group of colliders of the first control object.

S2: when the action type is a non-attack type, updating, at a frequency less than or equal to the first pre-determined threshold, the collision animation performed by the skeleton and the group of colliders of the first control object.

In some embodiments, the when the action type is an attack type, updating, at a frequency greater than a first pre-determined threshold, the collision animation performed by the skeleton and the group of colliders of the first control object may include: S11: in an attack process of an attack indicated by the attack type, updating, at a frequency greater than a second pre-determined threshold, the collision animation performed by the skeleton and the group of colliders of the first control object; S12: in an attack preparing process or an attack defending process of the attack, updating, at a frequency less than or equal to the second pre-determined threshold, the collision animation performed by the skeleton and the group of colliders of the first control object, the second pre-determined area being greater than the first pre-determined threshold.

Details are described with reference to Table 1. Table 1 shows animation states at different frequencies.

TABLE 1

| Serial number | Animation state | Update frequency |
| --- | --- | --- |
| 1 | Standby | low frequency |
| 2 | shield using | low frequency |
| 3 | shield stowing | low frequency |
| 4 | attacked by shield | medium frequency |
| 5 | defense collapsed and attacked | low frequency |
| 6 | repelled | medium frequency |
| 7 | kicking upward preparation | low frequency |
| 8 | kicking upward power accumulation | low frequency |
| 9 | kicking upward process | high frequency |
| 10 | kicking upward ended | low frequency |
| 11 | kicking upward rebounded | low frequency |
| 12 | kicking upward warded off | low frequency |

In some embodiments, the updating, according to an action type of the collision action at a pre-determined frequency, a collision animation matching the collision action and performed by the skeleton and the group of colliders of the first control object may include:

S1: obtaining, at a time interval corresponding to the pre-determined frequency, a performing progress of the first control object of performing the collision animation.

S2: calculating a location of the skeleton in the performing progress.

S3: updating a location of the group of colliders in the collision animation according to the location of the skeleton.

In some embodiments, the foregoing collision animation matching the collision action may be but is not limited to being pre-configured. According to different performing progresses, the location of corresponding skeleton may be calculated but is not limited to be calculated directly or indirectly, and then the location of the group of colliders excluding the skeleton and driven by the skeleton is calculated.

In this embodiment of this application, a location of a skeleton is calculated at a time interval corresponding to a pre-determined frequency and according to a play progress (that is, a performing progress) of each collision animation, so that a location of a group of colliders in the collision animation is updated.

In some embodiments, after the controlling the skeleton and the group of colliders to perform the collision action, the method further may include:

S1: detecting whether the first control object collides with a second control object.

S2: after it is detected that the first control object collides with the second control object, obtaining an action state of the collision.

S3: obtaining, according to the action state of the collision, collision information matching the collision action to be performed by the first control object.

In some embodiments, the detecting whether the first control object collides with a second control object may include:

S11: detecting whether a first cuboid in which the first control object is located intersects with a second cuboid in which the second control object is located.

S12: after it is detected that the first cuboid in which the first control object is located intersects with the second cuboid in which the second control object is located, detecting whether a first convex hull in which the first control object is located intersects with a second convex hull in which the second control object is located, a volume of the first convex hull being smaller than a volume of the first cuboid, the volume of the first convex hull being greater than a volume of the group of colliders of the first control object, a volume of the second convex hull being smaller than a volume of the second cuboid, and the volume of the second convex hull being greater than a volume of a group of colliders of the second control object.

S13: after it is detected that the first convex hull in which the first control object is located intersects with the second convex hull in which the second control object is located, detecting whether the group of colliders of the first control object intersect with the group of colliders of the second control object.

S4: after it is detected that the group of colliders of the first control object intersect with the group of colliders of the second control object, determining that the first control object collides with the second control object.

Figure 10:
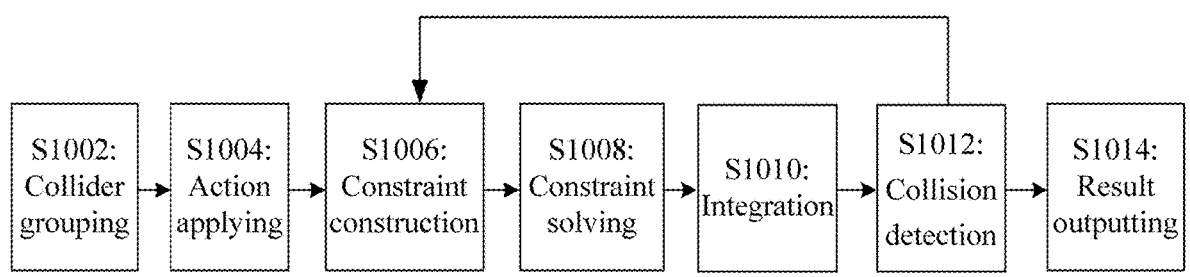
FIG. 10 is a schematic flowchart of still another collision control method according to an embodiment of this application.

Details are described with reference to the following example. As shown in FIG. 10:

S1002: Collider grouping. Colliders are grouped according to correlation.

Each group is independent from another. Activation and sleeping are performed by group, and collision detection is performed on a group in an activated state. It is assumed that a body collider (for example, the head collider, the torso collider, and the leg collider shown in the middle part of FIG. 7) and an equipment collider (for example, a weapon) are configured for each control object. The foregoing four colliders may be grouped together. When the control object is in a still state in a long term and is relatively distant from another group of colliders, the control object may enter a sleep state, and is activated only when being relatively close to another group of colliders.

S1004: Action applying. The action applied herein is a provided interface such as an applied force or impulse for changing a movement of a collider. When an equipment collider (for example, a weapon) intersects with a torso collider, an action force is generated according to a physical law. The action force is applied to the weapon and the body collider, so that the two colliders have a tendency to move toward a direction.

S1006: Constraint construction. A constraint is used for limiting a moving direction of a collider, including a touch constraint (generated when collision occurs between objects and used for preventing the colliders from being mutually penetrated) and a configuration constraint (a constraint such as a hinge joint or a ball joint configured between objects). There is a constraint between a weapon and a body collider, and there are two ball-joint constraints among three colliders (preventing a body collider from disintegrating). A joint action of these constraints limits a moving direction of a collider.

S1008: Constraint solving. Iteration is used to try minimizing an error between an actual location of a collider in the physical world and an ideal location defined by a constraint, and the collider is moved to satisfy a maximum quantity of constraints. A collision point (touch constraint) obtained by collision detection is also a type of constraint, and needs to be cyclically substituted for constraint solving, to ultimately obtain a latest instantaneous location of a collider.

S1010: Integration. Because a collider is moving instead of is still, a constraint solving result needs to be substituted into a motion equation of each collider participating in collision for performing another calculation, to obtain a new location, heading direction, speed, acceleration, or the like of the collider.

S1012: Collision detection, divided into three phases to reduce a quantity of collider sets required to be detected in each step.

1. Rough phase: Determining, by testing by using a cuboid bounding box, collider groups that may be collided. The cuboid bounding box detection method can determining whether intersection occurs by focusing on only a relative location relationship of eight vertexes, and is therefore being used for preliminary detection and can highly efficiently exclude a large quantity of collider groups that will not intersect with each other.

2. Middle phase: Detecting compound-shaped convex hulls (using a more refinable polyhedron to enclose a collider group, where the polyhedron tries to tightly enclose the collider group and needs to be convex, and a calculation amount of convex hulls is much smaller than that of collider groups). If the convex hulls do not intersect with each other, collision between colliders does not need to be tested.

3. Precise phase: Testing whether colliders in collider groups intersect.

After it is detected that the colliders in the collider groups intersect, the colliders in the collider groups are used as a touch constraint and substituted into S1006 for iteration. The iteration is repeated for a plurality of times. When a difference between results of each two times of iteration is smaller than a pre-determined threshold, the results may be used as a collision detection result.

S1014: Result outputting. The collision detection result is output.

In this embodiment of this application, a processing amount of collision detection is reduced through collision detection on the different phases, so that an objective of reducing processing overheads and improving a detection performance is achieved, and an effect of improving the efficiency of collision detection is achieved.

In some embodiments, the obtaining, according to the action state of the collision, collision information matching the collision action to be performed by the first control object may include:

S1: when the action state is a fight state, obtaining the collision information matching the collision action to be performed by the first control object.

S1: when the action state is a non-fight state, ignoring the collision information of the collision action to be performed by the first control object.

In some embodiments, collision actions generated in different action states may be but is not limited to being respectively filtered and collated.

For example, the collision information of the collision action generated in the non-fight state may be but is not limited to being ignored. It should be noted that, collision information may be obtained when two control objects brush against each other when being not in a fight state. Filtering of such a type of collision information may be ignored, to reduce processing overheads of the server.

For another example, the collision information of the collision action generated in the fight state may be but is not limited to being obtained directly, or may be but is not limited to being obtained after being filtered according to a pre-determined condition. Each collision has a gradually changing passing-through process, for example, it is that edges are touched first, and then entire colliders are touched, and then edges are touched, and finally the colliders are separated from each other. It should be noted herein that, if the colliders are relatively thick, there may be a plurality of times of entire collision and a plurality of pieces of collision information is obtained. In this case, it may be but is not limited to selecting a value of middlemost collision information, to ultimately form collision information cared about by an upper-layer fight logic, so that the fight logic can obtain collision data of very high quality.

In this embodiment of this application, the collision information generated by the collision action is filtered according to different action states, so that information content for controlling is simplified, and a space for storing the collision information is saved.

In some embodiments, after the controlling the skeleton and the group of colliders to perform the collision action, the method further may include:

S1: controlling the game client to present, according to a timeline of a server, the collision action performed by the first control object.

In some embodiments, the controlling the game client to present, according to a timeline of a server, the collision action performed by the first control object may include but is not limited to: notifying the game client to cache a pre-determined time period, so that the game client synchronously presents the collision action according to the timeline of the server after the pre-determined time period.

In some embodiments, the controlling the game client to present, according to a timeline of a server, the collision action performed by the first control object may further include but is not limited to: notifying the game client to cache a pre-determined frame.

Figure 11:
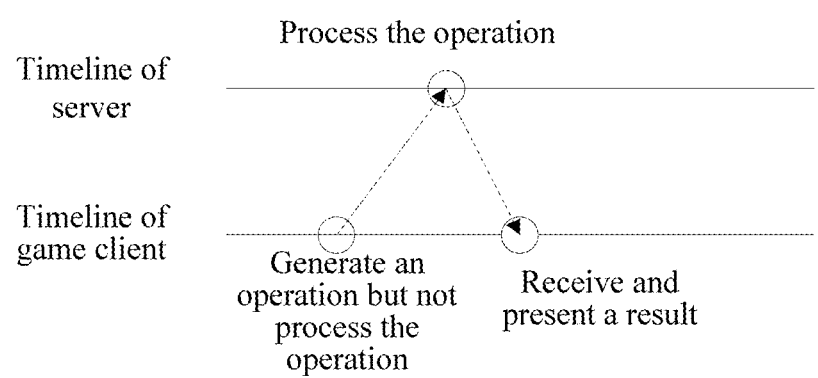
FIG. 11 is a schematic diagram of another collision control method according to an embodiment of this application.

Details are described with reference to the following example. The server obtains the collision action from the game client, and controls to deliver the collision animation to the game client for presentation after simplifying and analyzing the control object, and notifies the game client to cache a time period, so that the presentation is performed according to the timeline of the server. FIG. 11 shows a timeline of a game client and a timeline of a server. The game client generates an operation but does not process the operation, and sends the operation to the server for processing, and then the server sends a result to the game client for presentation. In this way, a network delay of the client is offset, thereby ensuring consistency between result playing of different clients.

It should be noted that, in this embodiment, if the network delay is relatively short, the time period cached by the client is close to 40 milliseconds. If the network delay is relatively long, there is a 40-millisecond cached time period to offset the delay. If the cached time period can be maintained at 0 to 40 milliseconds, a result seen by a player is completely the same as a playing time sequence and rhythm of an operation on the timeline of the server end.

In this embodiment of this application, by using the foregoing method, a synchronization mechanism is implemented between the client and the server, thereby effectively resolving the problem of inconsistency caused by delays in network transmission.

It should be noted that, to simplify the description, the foregoing method embodiments are described as a series of action combination. But a person skilled in the art should know that this application is not limited to any described sequence of the action, as some steps can adopt other sequences or can be performed simultaneously according to this application. Secondarily, a person skilled in the art should know that the embodiments described in the specification all belong to optional embodiments and the described actions and modules are not necessary for this application.

According to description of the foregoing implementation, a person skilled in the art may clearly learn that the method in the foregoing embodiment may be implemented by relying on software and a necessary common hardware platform or by using hardware, but the former one is a preferred implementation in many cases. Based on such an understanding, the technical solutions in this application essentially or the part contributing to the related technology may be implemented in the form of a software product. The computer software product is stored in a storage medium (such as a read-only memory (ROM)/random access memory (RAM), a magnetic disk, or an optical disc), and includes several instructions for instructing a terminal device (which may be a mobile phone, a computer, a server, a network device, and the like) to perform the method described in the embodiments of this application.

Embodiment 2

Figure 12:
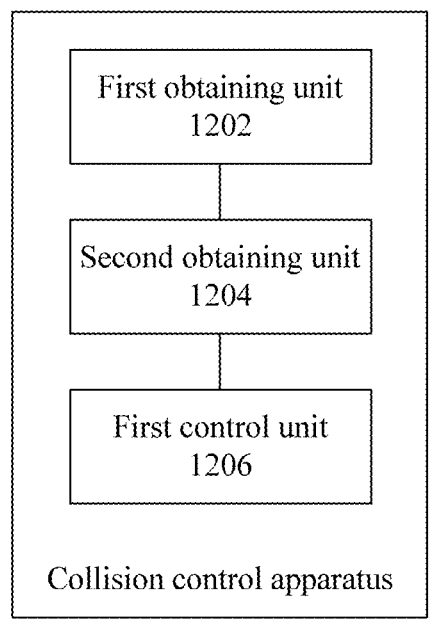
FIG. 12 is a schematic diagram of a collision control apparatus according to an embodiment of this application.

According to this embodiment of this application, a collision control apparatus used for performing the foregoing collision control method is further provided. As shown in FIG. 12, the apparatus may include:

1) a first obtaining unit 1202, configured to: obtain a collision action to be performed by a first control object in a game client;

2) a second obtaining unit 1204, configured to obtain entity information of the first control object, the entity information including first entity information and second entity information, the first entity information being used for representing a skeleton of the first control object, and the second entity information being used for representing a group of colliders of the first control object excluding the skeleton and driven by the skeleton; and 3) a first control unit 1206, configured to: control the skeleton and the group of colliders to perform the collision action.

In some embodiments, the collision control apparatus may be applied but is not limited to a 3D network game application, for example, a role play-type game application or an action-type game application. The first control object in the game client may be but is not limited to any role in a 3D game application, for example, a character role. The foregoing is merely exemplary, and no limitation is set in this embodiment.

It should be noted that, in this embodiment, after obtaining the collision action to be performed by the first control object in the game client, the server obtains the entity information of the first control object, the entity information including the first entity information being used for representing a skeleton of the first control object and the second entity information being used for representing a group of colliders of the first control object excluding the skeleton and driven by the skeleton, to control the skeleton and the group of colliders to perform the collision action. That is, the first control object in the game client is simplified, to ignore detailed information related to rendering (used for reflecting a real appearance of the first control object but not related to collision control), and the collision action is performed by using the skeleton and the group of colliders obtained by simplification and matching the first control object, so that an objective of reducing the calculation amount in a collision determining process and improving the calculation accuracy is achieved. In this way, a problem is resolved that, in the related technology, in a collision determining process performed by using a voxel-based model, it is hard to ensure the accuracy of the collision determining when the calculation amount is reduced, thereby achieving an effect of improving the accuracy of collision control performed on the first control object. In addition, by simplifying the first control object to obtain the skeleton and the group of colliders that match the first control object, overheads of processing collision control by the server is greatly reduced, thereby achieving an objective of reducing a processing time period and implementing real-time and synchronous controlling, and further achieving an effect of improving the efficiency of collision control.

In some embodiments, the apparatus further may include: 1) a first construction unit, configured to: after the entity information of the first control object is obtained, construct a skeleton according to the first entity information, the skeleton including a head skeleton, a torso skeleton, and a leg skeleton; and 2) a second construction unit, configured to construct a group of colliders according to the second entity information, the group of colliders including at least one of the following: a body collider or an equipment collider, the body collider including a head collider, a torso collider, and a leg collider.

For example, a presentation effect of the first control object (for example, a character role) may be but is not limited to that shown in the rightmost part of FIG. 7, and a presentation effect of the skeleton (represented by the first entity information) matching the first control object may be but is not limited to that shown in the leftmost part of FIG. 7, and a presentation effect of the group of colliders (represented by the second entity information) may be but is not limited to that shown in the middle part of FIG. 7. Each of a head, a torso and legs of the first control object is replaced with a capsule (two ends of which are spheroidal and a middle part of which is cylinderlike) to obtain the colliders. It should be noted that, the torso part may be replaced with a plurality of segments of different 3D components such as spheres or cylinders to obtain a corresponding collider. This is not limited in this embodiment.

It should be noted that, in an operation performed in a game application, the head, the body and the legs are usually effective parts for determining. For example, in an action-type game application, whether an attack is effective is usually determined by determining whether the head, the body or the legs is attacked. In addition, an error between a length of the simplified skeleton relative to a weapon equipment and a length of the original first control object and an error between a length of the simplified group of colliders relative to the weapon equipment and the length of the original first control object may be ignored. Therefore, in this embodiment, collision control and collision detection are relatively accurate after the foregoing simplification is performed.

In some embodiments, the foregoing collision action may correspond but is not limited to a set of successive collision animations. In this embodiment, controlled conversion of the action in the foregoing collision control process may be implemented by but is not limited to by using an action state machine. For example, as shown in FIG. 8, using a fight state as an example, different action states (for example, blocks shown in FIG. 8) and switching manners between the states (for example, straight lines with arrows shown in FIG. 8) are set in the action state machine. Controlled conversion of the animation may be implemented by but is not limited to by using a corresponding animation state machine. Reference for a set relationship may be made but is not limited to FIG. 8. This is not described in detail in this embodiment.

Specifically, steps of implementing collision control by using the action state machine and the animation state are described with reference to FIG. 9.

S1: Obtain the collision action to be performed (for example, obtain, by using instructions, the collision action to be performed), and a fight logical module sends a message to an action module.

S2: An action state machine in the action module performs state switching in response to the message, and sends a message to the animation state machine.

S3: The animation state machine drives, in response to the message, the first control object to enter a corresponding animation state.

S4: Drive the group of colliders matching the first control object to perform a collision movement in a 3D space.

S5: A physical engine detects the collision generated by the group of colliders, and a plurality of pieces of collision information is detected in each collision.

S6: Feedback the collision information to the action module, and the action module analyzes and filters the collision information according to a requirement of the current state, and then feeds back the filtered result to a fight logic. The requirement of the current state may include but is not limited to: whether the current state is a state in which the collision is generated, in which time segments in the state a collision is effective, or the like.

S7: The fight logic calculates a result according to the collision, and notifies the game client of the result to present the collision animation.

It should be noted that, in this embodiment, the action state machine may be used for but is not limited to providing a series of interfaces for a fight logic on an upper-layer, and receiving instructions and processing the received instructions, thereby shielding other details irrelevant to the action for the upper layer. The upper-layer logic only needs to know the action and performs driving. A lower-layer system does not need to care about the upper-layer fight logic, for example, whether an action can interrupt another action, or an operation performed for entering or exiting from an action. In addition, the action state machine is further used for performing necessary verification and filtering a collision detection result. For example, if the colliders collide when not in a fight state, collision information may also be generated. Such collision information needs to be filtered out and ignored. A plurality of pieces of collision information generated in a fight state also needs to be effectively filtered, and only effective collision information is obtained, thereby achieving an objective of reducing the processing amount and processing overheads. The foregoing animation state machine may be used for but is not limited to managing skeleton animations corresponding to different skeletons. It should be noted that, in this embodiment, the skeleton is used for driving the group of colliders to move. Therefore, in each segment of collision animation corresponding to the collision action, when the skeleton is controlled to move (for example, collide) correspondingly, the group of colliders excluding the skeleton and driven by the skeleton are driven to move (for example, collide) correspondingly.

In some embodiments, the server may use but is not limited to a Havok physical engine to implement real-time collision control. It should be noted that, the foregoing Havok physical engine is used for providing rapid and highly efficient physical simulation calculation. In this embodiment, by simplifying the first control object to obtain the corresponding skeleton and group of colliders, and then using the highly efficient processing capability of the Havok physical engine, real-time collision control with a high performance can be further ensured. In addition, all fight results are determined based on real physical force-bearing, so that the collision detection effect is more real.

In some embodiments, the foregoing controlling the skeleton and the group of colliders to perform the collision action includes: updating, according to an action type of the collision action at a pre-determined frequency, a collision animation matching the collision action and performed by the skeleton and the group of colliders of the first control object.

It should be noted that, because different action types use different presentation effects, for example, when the action type is an attack type, a relatively large quantity of collision actions are involved, in this embodiment, the corresponding collision animation may be updated at but is not limited to a frequency greater than a pre-determined threshold. On the contrary, when the action type is a non-attack type, because no collision action is involved, the corresponding collision animation may be updated at but is not limited to a frequency less than or equal to the pre-determined threshold. In addition, in this embodiment, different processes of an action type may be set with but is not limited to different update frequencies. This is not limited in this embodiment. By updating the corresponding collision animation in the frequency-changing update manner, processing overheads of collision control is ensured to be reduced, thereby achieving an objective of presenting the collision animation in real time and accurately.

In some embodiments, after the controlling the skeleton and the group of colliders to perform the collision action, the method further includes: controlling the game client to present, according to a timeline of a server, the collision action performed by the first control object.

It should be noted that, in this embodiment, to avoid inconsistency between the client and the server and that between different clients caused by network delay and network fluctuation, all logics in the game client are controlled to be consistent with the timeline of the server. A logic of the server is pushed forward along a fixed timeline. By using the foregoing method, a synchronization mechanism is implemented between the client and the server, thereby effectively resolving the problem of inconsistency caused by network transmission.

In this embodiment of this application, after obtaining the collision action to be performed by the first control object in the game client, the server obtains the entity information of the first control object, the entity information including the first entity information being used for representing a skeleton of the first control object and the second entity information being used for representing a group of colliders of the first control object excluding the skeleton and driven by the skeleton, to control the skeleton and the group of colliders to perform the collision action. That is, the first control object in the game client is simplified, to ignore detailed information related to rendering (used for reflecting a real appearance of the first control object but not related to collision control), and the collision action is performed by using the skeleton and the group of colliders obtained by simplification and matching the first control object, so that an objective of reducing the calculation amount in a collision determining process and improving the calculation accuracy is achieved. In this way, a problem is resolved that, in the related technology, in a collision determining process performed by using a voxel-based model, it is hard to ensure the accuracy of the collision determining when the calculation amount is reduced, thereby achieving an effect of improving the accuracy of collision control performed on the first control object. In addition, by simplifying the first control object to obtain the skeleton and the group of colliders that match the first control object, overheads of processing collision control by the server is greatly reduced, thereby achieving an objective of reducing a processing time period and implementing real-time and synchronous controlling, and further achieving an effect of improving the efficiency of collision control.

In some embodiments, the first control unit 1206 may include:

1) a control module, configured to: update, according to an action type of the collision action at a pre-determined frequency, a collision animation matching the collision action and performed by the skeleton and the group of colliders of the first control object.

In some embodiments, different action types may be configured with but are not limited to different pre-determined frequencies. For example, an attack type action may be configured with but is not limited to a high frequency for updating, and a non-attack type action may be configured with but is not limited to a low frequency for updating. For example, a lowest frequency may be 1 time per second, and a highest frequency may be 20 times per second.

It should be noted that, when a role (for example, a control object) in a game application is walking and moving, or is performing an action irrelevant to fight collision, because a real-time quality is not required to be very high, in this embodiment, the actions may be configured with but is not limited to a frequency lower than a pre-determined threshold (that is, a low frequency) for updating, provided that the actions are ensured to reach a target location after being performed. The target location may be but is not limited to an initial location of a collision action updated at a frequency higher than a pre-determined threshold (that is, a high frequency). In this way, it is ensured that when the collision action is performed, accurate and real-time collision control can be implemented.

In some embodiments, the updating the collision animation may be but is not limited to updating a location of the skeleton and a location of the corresponding group of colliders in the collision animation. That is, in this embodiment, it may be but is not limited to obtaining, in real time, a performing progress of the collision animation corresponding to the collision action, calculating the location of the skeleton according to the performing progress, and obtaining the location of the group of colliders corresponding to the location of the skeleton, to update the location of the group of colliders.

In this embodiment of this application, updating of the collision animation corresponding to the collision action may be controlled according to different action types and by using the frequency-changing update policy, so that an objective of saving a large quantity of calculation processing overheads and improving the application performance is achieved, thereby ensuring the real-time quality and the accuracy of collision control.

In some embodiments, the control module may include:

1) a first control submodule, configured to: when the action type is an attack type, update, at a frequency greater than a first pre-determined threshold, the collision animation performed by the skeleton and the group of colliders of the first control object; and 2) a second control submodule, configured to: when the action type is a non-attack type, update, at a frequency less than or equal to the first pre-determined threshold, the collision animation performed by the skeleton and the group of colliders of the first control object.

In some embodiments, the first control submodule implements, by using the following steps, the when the action type is an attack type, update, at a frequency greater than a first pre-determined threshold, the collision animation performed by the skeleton and the group of colliders of the first control object: in an attack process of an attack indicated by the attack type, updating, at a frequency greater than a second pre-determined threshold, the collision animation performed by the skeleton and the group of colliders of the first control object; or in an attack preparing process or an attack defending process of the attack, updating, at a frequency less than or equal to the second pre-determined threshold, the collision animation performed by the skeleton and the group of colliders of the first control object, the second pre-determined area being greater than the first pre-determined threshold.

Details are described with reference to Table 2. Table 2 shows animation states at different frequencies.

TABLE 2

| Serial number | Animation state | Update frequency |
| --- | --- | --- |
| 1 | standby | low frequency |
| 2 | shield using | low frequency |
| 3 | shield stowing | low frequency |
| 4 | attacked by shield | medium frequency |
| 5 | defense collapsed and attacked | low frequency |
| 6 | repelled | medium frequency |
| 7 | kicking upward preparation | low frequency |
| 8 | kicking upward power accumulation | low frequency |
| 9 | kicking upward process | high frequency |
| 10 | kicking upward ended | low frequency |
| 11 | kicking upward rebounded | low frequency |
| 12 | kicking upward warded off | low frequency |

In this embodiment of this application, different update frequencies may be set for different action types and different processes, so that the skeleton and the group of colliders of the control object are updated by means of frequency changing, thereby reducing processing overheads and ensuring real-time collision control.

In some embodiments, the control module may include:

1) an obtaining submodule, configured to: obtain, at a time interval corresponding to the pre-determined frequency, a performing progress of the first control object of performing the collision animation;

2) a calculation submodule, configured to: calculate a location of the skeleton in the performing progress; and 3) an update submodule, configured to: update a location of the group of colliders in the collision animation according to the location of the skeleton.

In some embodiments, the foregoing collision animation matching the collision action may be but is not limited to being pre-configured. According to different performing progresses, the location of corresponding skeleton may be calculated but is not limited to be calculated directly or indirectly, and then the location of the group of colliders excluding the skeleton and driven by the skeleton is calculated.

In this embodiment of this application, a location of a skeleton may be calculated at a time interval corresponding to a pre-determined frequency and according to a play progress (that is, a performing progress) of each collision animation, so that a location of a group of colliders in the collision animation is updated.

In some embodiments, the first obtaining unit 1202 may include:

1) a detection module, configured to: after the controlling the skeleton and the group of colliders to perform the collision action, detect whether the first control object collides with a second control object;

2) a first obtaining module, configured to: after it is detected that the first control object collides with the second control object, obtain an action state of the collision; and 3) a second obtaining module, configured to: obtain, according to the action state of the collision, collision information matching the collision action to be performed by the first control object.

In some embodiments, the detection module may include:

(1) a first detection submodule, configured to: detect whether a first cuboid in which the first control object is located intersects with a second cuboid in which the second control object is located;

(2) a second detection submodule, configured to: after it is detected that the first cuboid in which the first control object is located intersects with the second cuboid in which the second control object is located, detect whether a first convex hull in which the first control object is located intersects with a second convex hull in which the second control object is located, a volume of the first convex hull being smaller than a volume of the first cuboid, the volume of the first convex hull being greater than a volume of the group of colliders of the first control object, a volume of the second convex hull being smaller than a volume of the second cuboid, and the volume of the second convex hull being greater than a volume of a group of colliders of the second control object;

(3) a third detection submodule, configured to: after it is detected that the first convex hull in which the first control object is located intersects with the second convex hull in which the second control object is located, detect whether the group of colliders of the first control object intersect with the group of colliders of the second control object; and (4) a determining submodule, configured to: after it is detected that the group of colliders of the first control object intersect with the group of colliders of the second control object, determine that the first control object collides with the second control object.

Details are described with reference to the following example. As shown in FIG. 10:

S1002: Collider grouping. Colliders are grouped according to correlation. Each group is independent from another. Activation and sleeping are performed by group, and collision detection is performed on a group in an activated state. It is assumed that a body collider (for example, the head collider, the torso collider, and the leg collider shown in the middle part of FIG. 7) and an equipment collider (for example, a weapon) are configured for each control object. The foregoing four colliders may be grouped together. When the control object is in a still state in a long term and is relatively distant from another group of colliders, the control object may enter a sleep state, and is activated only when being relatively close to another group of colliders.

S1004: Action applying. The action applied herein is a provided interface such as an applied force or impulse for changing a movement of a collider. When an equipment collider (for example, a weapon) intersects with a torso collider, an action force is generated according to a physical law. The action force is applied to the weapon and the body collider, so that the two colliders have a tendency to move toward a direction.

S1006: Constraint construction. A constraint is used for limiting a moving direction of a collider, including a touch constraint (generated when collision occurs between objects and used for preventing the colliders from being mutually penetrated) and a configuration constraint (a constraint such as a hinge joint or a ball joint configured between objects). There is a constraint between a weapon and a body collider, and there are two ball-joint constraints among three colliders (preventing a body collider from disintegrating). A joint action of these constraints limits a moving direction of a collider.

S1008: Constraint solving. Iteration is used to try minimizing an error between an actual location of a collider in the physical world and an ideal location defined by a constraint, and the collider is moved to satisfy a maximum quantity of constraints. A collision point (touch constraint) obtained by collision detection is also a type of constraint, and needs to be cyclically substituted for constraint solving, to ultimately obtain a latest instantaneous location of a collider.

S1010: Integration. Because a collider is moving instead of is still, a constraint solving result needs to be substituted into a motion equation of each collider participating in collision for performing another calculation, to obtain a new location, heading direction, speed, acceleration, or the like of the collider.

S1012: Collision detection, divided into three phases to reduce a quantity of collider sets required to be detected in each step.

1. Rough phase: Determining, by testing by using a cuboid bounding box, collider groups that may be collided. The cuboid bounding box detection method can determining whether intersection occurs by focusing on only a relative location relationship of eight vertexes, and is therefore being used for preliminary detection and can highly efficiently exclude a large quantity of collider groups that will not intersect with each other.

2. Middle phase: Detecting compound-shaped convex hulls (using a more refinable polyhedron to enclose a collider group, where the polyhedron tries to tightly enclose the collider group and needs to be convex, and a calculation amount of convex hulls is much smaller than that of collider groups). If the convex hulls do not intersect with each other, collision between colliders does not need to be tested.

3. Precise phase: Testing whether colliders in collider groups intersect.

After it is detected that the colliders in the collider groups intersect, the colliders in the collider groups are used as a touch constraint and substituted into S1006 for iteration. The iteration is repeated for a plurality of times. When a difference between results of each two times of iteration is smaller than a pre-determined threshold, the results may be used as a collision detection result.

S1014: Result outputting. The collision detection result is output.

In this embodiment of this application, a processing amount of collision detection is reduced through collision detection on the different phases, so that an objective of reducing processing overheads and improving a detection performance is achieved, and an effect of improving the efficiency of collision detection is achieved.

In some embodiments, the second obtaining module may include:

1) a first obtaining submodule, configured to: when the action state is a fight state, obtain the collision information matching the collision action to be performed by the first control object; and 2) a second obtaining submodule, configured to: when the action state is a non-fight state, ignore the collision information of the collision action to be performed by the first control object.

In some embodiments, collision actions generated in different action states may be but is not limited to being respectively filtered and collated.

For example, the collision information of the collision action generated in the non-fight state may be but is not limited to being ignored. It should be noted that, collision information may be obtained when two control objects brush against each other when being not in a fight state. Filtering of such a type of collision information may be ignored, to reduce processing overheads of the server.

For another example, the collision information of the collision action generated in the fight state may be but is not limited to being obtained directly, or may be but is not limited to being obtained after being filtered according to a pre-determined condition. Each collision has a gradually changing passing-through process, for example, it is that edges are touched first, and then entire colliders are touched, and then edges are touched, and finally the colliders are separated from each other. It should be noted herein that, if the colliders are relatively thick, there may be a plurality of times of entire collision and a plurality of pieces of collision information is obtained. In this case, it may be but is not limited to selecting a value of middlemost collision information, to ultimately form collision information cared about by an upper-layer fight logic, so that the fight logic can obtain collision data of very high quality.

In this embodiment of this application, the collision information generated by the collision action may be filtered according to different action states, so that information content for controlling is simplified, and a space for storing the collision information is saved.

In some embodiments, the following may further be included:

1) a second control unit, configured to: after the controlling the skeleton and the group of colliders to perform the collision action, control the game client to present, according to a timeline of a server, the collision action performed by the first control object.

In some embodiments, the second control unit may include a notification module, configured to notify the game client to cache a pre-determined time period, so that the game client synchronously presents the collision action according to the timeline of the server after the pre-determined time period.

In some embodiments, the controlling the game client to present, according to a timeline of a server, the collision action performed by the first control object may further include but is not limited to: notifying the game client to cache a pre-determined frame.

Details are described with reference to the following example. The server obtains the collision action from the game client, and controls to deliver the collision animation to the game client for presentation after simplifying and analyzing the control object, and notifies the game client to cache a time period, so that the presentation is performed according to the timeline of the server. FIG. 11 shows a timeline of a game client and a timeline of a server. The game client generates an operation but does not process the operation, and sends the operation to the server for processing, and then the server sends a result to the game client for presentation. In this way, a network delay of the client is offset, thereby ensuring consistency between result playing of different clients.

It should be noted that, in this embodiment, if the network delay is relatively short, the time period cached by the client is close to 40 milliseconds. If the network delay is relatively long, there is a 40-millisecond cached time period to offset the delay. If the cached time period can be maintained at 0 to 40 milliseconds, a result seen by a player is completely the same as a playing time sequence and rhythm of an operation on the timeline of the server end.

In this embodiment of this application, by using the foregoing method, a synchronization mechanism may be implemented between the client and the server, thereby effectively resolving the problem of inconsistency caused by network transmission.

Embodiment 3

For an application environment of this embodiment of this application, reference may be made but is not limited to the application environment of Embodiment 1. This is not described in detail in this embodiment. This embodiment of this application provides an application example used for performing the foregoing collision control method.

In an embodiment, it is assumed that a 3D network action-type game is used as an example of a game on a game application client, and 150 persons fight smoothly against another 150 persons in one full 3D network game scenario. It is assumed that five pairs of roles perform a collision action of an attack type in a fight state, a server simplifies the foregoing roles to a large extent, and abandons all detailed information irrelevant to the collision action. That is, a skeleton and a collider group corresponding to each role may be constructed by obtaining entity information of the foregoing different roles (that is, control objects). When collision occurs, the server end controls the skeleton and the collider group to perform an collision animation corresponding to the collision movement, so that a corresponding collision animation is synchronously presented to the client, and the collision animations are highly consistent with each other (for example, whether collision occurs, a location where the collision occurs and a force of the collision) and are highly precise. A collision animation of a corresponding collision action is updated by means of frequency-changing update, thereby implementing real, real-time, and accurate collision control and collision detection. For a specific embodiment, refer to the foregoing Embodiment 1 and Embodiment 2, and this is not limited in this embodiment.

In this embodiment, the true 3D collision detection is implemented by the server end. Furthermore, on the premise that a relatively high quality of collision detection is ensured, a 3D model and a collision detection procedure are simplified, so that a calculation amount is reduced, and a bearer capability is relatively high, thereby ensuring the accuracy of collision control. In addition, in this embodiment, network synchronism is optimized. By notifying a client to cache a pre-determined time period, to present a collision animation according to a timeline of a server, a problem that a presenting progress of the client is inconsistent with that of the server caused by network transmission is resolved, thereby improving the performance of the application client and user experience.

Embodiment 4

Figure 13:
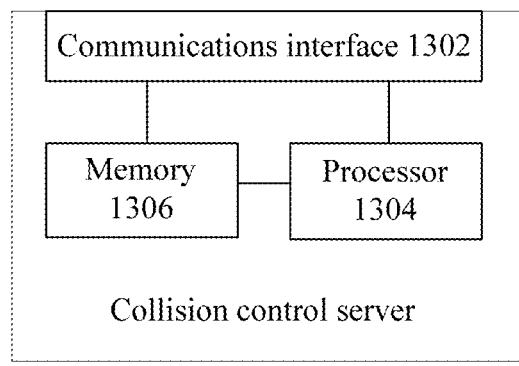
FIG. 13 is a schematic diagram of a collision control server according to an embodiment of this application.

According to this embodiment of this application, a collision control server used for performing the foregoing collision control method is further provided. As shown in FIG. 13, the server includes:

1) a communications interface 1302, configured to: obtain a collision action to be performed by a first control object in a game client;

2) a processor 1304, connected to the communications interface 1302 and configured to obtain entity information of the first control object, the entity information including first entity information and second entity information, the first entity information being used for representing a skeleton of the first control object, and the second entity information being used for representing a group of colliders of the first control object excluding the skeleton and driven by the skeleton; and is further configured to control the skeleton and the group of colliders to perform the collision action; and 3) a memory 1306, connected to the communications interface 1302 and the processor 1304, and configured to store the entity information of the first control object and the collision action to be performed by the first control object.

For a specific example in this embodiment, refer to the examples described in Embodiment 1 and Embodiment 2. This is not described in detail in this embodiment.

Embodiment 5

This embodiment of this application further provides a storage medium. In some embodiments, the foregoing storage medium may be located in at least one of a plurality of network devices in a network.

In some embodiments, the storage medium is set to store program code for performing the following steps:

S1: obtaining a collision action to be performed by a first control object in a game client;

S2: obtaining entity information of the first control object, the entity information including first entity information and second entity information, the first entity information being used for representing a skeleton of the first control object, and the second entity information being used for representing a group of colliders of the first control object excluding the skeleton and driven by the skeleton.

S3: controlling the skeleton and the group of colliders to perform the collision action.

The storage medium may be further set to store program code for performing the following step:

S1: updating, according to an action type of the collision action at a pre-determined frequency, a collision animation matching the collision action and performed by the skeleton and the group of colliders of the first control object;

The storage medium may be further set to store program code for performing the following steps:

S1: after the controlling the skeleton and the group of colliders to perform the collision action, detecting whether the first control object collides with a second control object.

S2: after it is detected that the first control object collides with the second control object, obtaining an action state of the collision.

S3: obtaining, according to the action state of the collision, collision information matching the collision action to be performed by the first control object.

The storage medium may be further set to store program code for performing the following steps: after the entity information of the first control object is obtained, constructing a skeleton according to the first entity information, the skeleton including a head skeleton, a torso skeleton, and a leg skeleton; and constructing a group of colliders according to the second entity information, the group of colliders including at least one of the following: a body collider or an equipment collider, the body collider including a head collider, a torso collider, and a leg collider.

The storage medium may be further set to store program code for performing the following step: after the controlling the skeleton and the group of colliders to perform the collision action, controlling the game client to present, according to a timeline of a server, the collision action performed by the first control object.

In some embodiments, the storage medium may include but is not limited to any medium that may store program code, such as a USB flash drive, a ROM, a RAM, a removable hard disk, a magnetic disk, or an optical disc.

For a specific example in this embodiment, refer to the examples described in Embodiment 1 and Embodiment 2. This is not described in detail in this embodiment.

The sequence numbers of the foregoing embodiments of this application are merely for description and do not indicate the preference of the embodiments.

When being implemented in the form of a software functional unit and sold or used as an independent product, the integrated unit in the foregoing embodiments may be stored in the foregoing computer-readable storage medium. Based on such an understanding, the technical solutions in this application essentially, or the part contributing to the related art technology, or all or some of the technical solutions may be implemented in the form of a software product. The computer software product is stored in a storage medium and includes several instructions for instructing one or more computer devices (which may be a personal computer, a server, a network device, or the like) to perform all or some of the steps of the methods in the embodiments of this application.

In the foregoing embodiments of this application, the description of each embodiment has respective focuses, and for the part that is not detailed in an embodiment, refer to the relevant description of other embodiments.

In the several embodiments provided in this application, it should be understood that the disclosed client may be implemented in other manners. The described apparatus embodiment is merely exemplary. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the units or modules may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions in the embodiments.

In addition, functional units in the embodiments of this application may be integrated into one processing unit, or each of the units may exist alone physically, or two or more units are integrated into one unit. The integrated unit may be implemented in the form of hardware, or may be implemented in the form of a software functional unit.

The foregoing descriptions are merely implementations of this application. It should be noted that a person of ordinary skill in the art may make improvements and polishing without departing from the principle of this application, and these all fall within the protection scope of this application.

This application provides a collision control method, including: obtaining a collision action to be performed by a first control object in a game client; obtaining entity information of the first control object, the entity information including first entity information and second entity information, the first entity information being used for representing a skeleton of the first control object, and the second entity information being used for representing a group of colliders of the first control object excluding the skeleton and driven by the skeleton; and controlling the skeleton and the group of colliders to perform the collision action. This method resolves the technical problem of a relatively low accuracy caused by using the collision control method in the related technology, thereby improving the efficiency of collision control.

What is claimed is:

1. A method comprising:
    obtaining, by at least one processor, a collision action to be performed by a first control object in a game client;
    obtaining, by the at least one processor, entity information of the first control object, the entity information comprising first entity information representing a skeleton of the first control object, and second entity information representing a group of colliders of the first control object excluding the skeleton and driven by the skeleton; and
    controlling, by the at least one processor, the skeleton and the group of colliders to perform the collision action of the first control object with a second control object based on the entity information by updating a collision animation of the first control object based on the collision action,
    wherein the collision animation is updated at a frequency based on an action type of the collision action, and
    wherein the updating comprises:
    in response to the action type being an attack type, updating the collision animation, at a frequency greater than a first frequency threshold; and
    in response to the action type being a non-attack type, updating the collision animation at a frequency less than or equal to the first frequency threshold.

2. The method according to claim 1, wherein the updating at the frequency greater than the first frequency threshold comprises:
    in an attack process of an attack indicated by the attack type, updating the collision animation at a frequency greater than a second frequency threshold; and
    in an attack preparing process or an attack defending process of the attack, updating the collision animation at a frequency less than or equal to the second frequency threshold, and wherein the second frequency threshold being greater than the first frequency threshold.

3. The method according to claim 1, wherein the updating comprises:
obtaining, at a time interval corresponding to the pre-determined frequency, a progress point of performing the collision animation;
calculating a location of the skeleton at the progress point; and
updating a location of the group of colliders in the collision animation according to the location of the skeleton that is calculated.

4. The method according to claim 1, further comprising:
detecting, by the at least one processor, whether the first control object collides with the second control object based on the entity information;
in response to detecting that the first control object collides with the second control object, obtaining, by the at least one processor, an action state of the collision; and
obtaining by the at least one processor, according to the action state, collision information of the collision action to be performed by the first control object.

5. The method according to claim 4, wherein the obtaining the collision information comprises:
ignoring the collision information in response to the action state being a non-fight state; and
the detecting comprises:
detecting whether a first cuboid in which the first control object is located intersects with a second cuboid in which the second control object is located;
in response to detecting that the first cuboid intersects with the second cuboid, detecting whether a first convex hull in which the first control object is located intersects with a second convex hull in which the second control object is located, a volume of the first convex hull being smaller than a volume of the first cuboid and greater than a volume of the group of colliders of the first control object, and a volume of the second convex hull being smaller than a volume of the second cuboid and greater than a volume of a group of colliders of the second control object;
in response to detecting that the first convex hull intersects with the second convex hull, detecting whether the group of colliders of the first control object intersect with the group of colliders of the second control object; and
in response to detecting that the group of colliders of the first control object intersect with the group of colliders of the second control object, determining that the first control object collides with the second control object.

6. The method according to claim 1, further comprising:
transmitting, by the at least one processor, a control signal to the game client to control the game client to present, according to a timeline of a server, the collision action performed by the first control object,
wherein the control signal notifies the game client to cache the collision action for a pre-determined time period and to synchronously present the collision action according to the timeline of the server after the pre-determined time period.

7. An apparatus comprising:
at least one memory configured to store computer program code; and
at least one processor configured to access the at least one memory and operate according to the computer program code, the computer program code including:
first obtaining code configured to cause at least one of the at least one processor to obtain a collision action to be performed by a first control object in a game client;
second obtaining code configured to cause at least one of the at least one processor to obtain entity information of the first control object, the entity information comprising first entity information representing a skeleton of the first control object, and second entity information representing a group of colliders of the first control object excluding the skeleton and driven by the skeleton; and
a first control code configured to cause at least one of the at least one processor to control the skeleton and the group of colliders to perform the collision action of the first control object with a second control object based on the entity information,
wherein the first control code comprises:
control code configured to cause at least one of the at least one processor to: update a collision animation based on the collision action,
wherein the collision animation is updated at a frequency based on an action type of the collision action, and
wherein the control code is configured to cause at least one of the at least one processor to: update, according to the action type of the collision action at a pre-determined frequency, a collision animation based on the collision action and performed by the skeleton and the group of colliders of the first control object;
the control code comprising:
first control subcode configured to cause at least one of the at least one processor to, in response to the action type being an attack type, update the collision animation, at a frequency greater than a first frequency threshold; and
second control subcode configured to cause at least one of the at least one processor to, in response to the action type being a non-attack type, updating the collision animation at a frequency less than or equal to the first frequency threshold.

8. The apparatus according to claim 7, wherein the control code comprises:
obtaining subcode configured to cause at least one of the at least one processor to: obtain, at a time interval corresponding to the pre-determined frequency, a progress point of performing the collision animation;
calculation subcode configured to cause at least one of the at least one processor to: calculate a location at the progress point; and
update subcode configured to cause at least one of the at least one processor to: update a location of the group of colliders in the collision animation according to the location that is calculated.

9. The apparatus according to claim 7, wherein the computer program code further comprises:
detection code configured to cause at least one of the at least one processor to detect whether the first control object collides with the second control object based on the entity information;
first obtaining code configured to cause at least one of the at least one processor to, in response to detecting that the first control object collides with the second control object, obtain an action state of the collision; and
second obtaining code configured to cause at least one of the at least one processor to obtain, according to the action state, collision information of the collision action to be performed by the first control object.

10. The apparatus according to claim 9, wherein
the second obtaining code is configured to cause the at least one of the at least one processor to ignore the collision information in response to the action state being a non-fight state; and
the detection code comprises:
first detection subcode configured to cause at least one of the at least one processor to, in response to detecting that a first cuboid intersects with a second cuboid, detect whether a first convex hull in which the first control object is located intersects with a second convex hull in which the second control object is located, a volume of the first convex hull being smaller than a volume of the first cuboid and greater than a volume of the group of colliders of the first control object, and a volume of the second convex hull being smaller than a volume of the second cuboid and greater than a volume of a group of colliders of the second control object;
second detection subcode configured to cause at least one of the at least one processor to, in response to detecting that the first convex hull intersects with the second convex hull, detecting whether the group of colliders of the first control object intersect with the group of colliders of the second control object; and
third detection subcode configured to cause at least one of the at least one processor to, in response to detecting that the group of colliders of the first control object intersect with the group of colliders of the second control object, determining that the first control object collides with the second control object.

11. The apparatus according to claim 7, further comprising:
transmission code configured to cause at least one of the at least one processor to transmit a control signal to the game client to control the game client to present, according to a timeline of a server, the collision action performed by the first control object,
wherein the control signal notifies the game client to cache the collision action for a pre-determined time period and to synchronously present the collision action according to the timeline of the server after the pre-determined time period.

12. The apparatus according to claim 9, wherein the first control subcode is configured to cause at least one of the at least one processor to:
in an attack process of an attack indicated by the attack type, updating the collision animation at a frequency greater than a second frequency threshold; and
in an attack preparing process or an attack defending process of the attack, updating the collision animation at a frequency less than or equal to the second frequency threshold, and wherein the second frequency threshold being greater than the first frequency threshold.

13. A non-transitory computer readable storage medium storing a program which, when executed by a processor, performs operations comprising:
obtaining a collision action to be performed by a first control object in a game client;
obtaining entity information of the first control object, the entity information comprising first entity information representing a skeleton of the first control object, and second entity information representing a group of colliders of the first control object excluding the skeleton and driven by the skeleton; and
controlling the skeleton and the group of colliders to perform the collision action of the first control object with a second control object based on the entity information by updating a collision animation of the first control object based on the collision action,
wherein the collision animation is updated at a frequency based on an action type of the collision action, and
wherein the updating comprises:
in response to the action type being an attack type, updating the collision animation, at a frequency greater than a first frequency threshold; and
in response to the action type being a non-attack type, updating the collision animation at a frequency less than or equal to the first frequency threshold.

\* \* \* \* \*